United States Patent
Duarte Gelvez et al.

(10) Patent No.: US 11,810,406 B2
(45) Date of Patent: *Nov. 7, 2023

(54) AUTONOMOUS VEHICLE DATA MANAGEMENT PLATFORM

(71) Applicant: GM CRUISE HOLDINGS LLC, San Francisco, CA (US)

(72) Inventors: Pedro Miquel Duarte Gelvez, San Francisco, CA (US); Vadim Antonov, San Francisco, CA (US); Dennis Suratna, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/569,731

(22) Filed: Jan. 6, 2022

(65) Prior Publication Data
US 2022/0135057 A1  May 5, 2022

Related U.S. Application Data

(63) Continuation of application No. 16/456,620, filed on Jun. 28, 2019, now Pat. No. 11,270,531.

(51) Int. Cl.
*G07C 5/00* (2006.01)
*G05D 1/02* (2020.01)
(Continued)

(52) U.S. Cl.
CPC .......... *G07C 5/008* (2013.01); *B60W 50/0205* (2013.01); *B60W 50/0225* (2013.01);
(Continued)

(58) Field of Classification Search
CPC ... G07C 5/008; G07C 5/0808; B60W 60/001; B60W 50/0205; B60W 50/0225; B60W 2556/45
See application file for complete search history.

(56) References Cited

U.S. PATENT DOCUMENTS 5,588,147 A   12/1996  Neeman et al.
5,940,367 A   8/1999   Antonov
(Continued)

FOREIGN PATENT DOCUMENTS

CN   102862568 A   1/2023

OTHER PUBLICATIONS

Americanarchive., "Using Checksum Manifests", Internet Article, Jun. 18, 2017, XP055680365, Retrieved from the Internet URL: http://wiki.americanarchive.org/index.php/Using_Checksum_Manifests, retrieved on (Mar. 27, 2020), pp. 1-3.
(Continued)

*Primary Examiner* — Gertrude Arthur Jeanglaude
(74) *Attorney, Agent, or Firm* — Novak Druce Carroll LLP

(57) ABSTRACT

A data management platform for Autonomous Vehicles (AVs) is provided. The data management platform can receive, from an AV at a first time, a first copy of a manifest including a creation history of a transformed object generated by the AV and a data integrity value corresponding to the transformed object. The data management platform can receive, from a second computing system at a second time, a second copy of the manifest. The data management platform can reconcile the first copy and the second copy. The data management platform can receive, from the second computing system at a third time, a request to upload the transformed object. The data management platform can validate the transformed object stored in storage of the first computing system based on the data integrity value included in the manifest.

20 Claims, 7 Drawing Sheets

(51) Int. Cl.
| | |
|---|---|
| *G06F 11/07* | (2006.01) |
| *G07C 5/08* | (2006.01) |
| *H04L 67/125* | (2022.01) |
| *B60W 60/00* | (2020.01) |
| *B60W 50/02* | (2012.01) |

(52) U.S. Cl.
CPC ......... *B60W 60/001* (2020.02); *G05D 1/0225* (2013.01); *G06F 11/079* (2013.01); *G06F 11/0739* (2013.01); *G07C 5/0808* (2013.01); *G07C 5/0841* (2013.01); *H04L 67/125* (2013.01); *B60W 2556/45* (2020.02)

(56) References Cited

U.S. PATENT DOCUMENTS

| | | | |
|---|---|---|---|
| 7,002,958 B1 | 2/2006 | Basturk et al. | |
| 8,990,257 B2 * | 3/2015 | Barton .................. | G06F 3/0626 707/E17.014 |
| 10,867,301 B2 | 12/2020 | Withrow et al. | |
| 11,270,531 B2 * | 3/2022 | Duarte Gelvez ..... | H04L 67/125 |
| 2003/0163693 A1 | 8/2003 | Medvinsky | |
| 2006/0015527 A1 | 1/2006 | Dingle | |
| 2008/0120129 A1 | 5/2008 | Seubert et al. | |
| 2010/0153239 A1 | 6/2010 | Liebich et al. | |
| 2015/0234931 A1 | 8/2015 | Dageville et al. | |
| 2015/0347499 A1 | 12/2015 | Keen et al. | |
| 2018/0018228 A1 | 1/2018 | Johnson | |
| 2018/0048464 A1 | 2/2018 | Lim et al. | |
| 2018/0089538 A1 | 3/2018 | Graham et al. | |
| 2019/0033388 A1 | 1/2019 | Karner et al. | |
| 2019/0039467 A1 | 2/2019 | Hortop et al. | |
| 2019/0243462 A1 | 8/2019 | Li | |
| 2019/0340261 A1 | 11/2019 | Jain et al. | |
| 2019/0369626 A1 | 12/2019 | Lui et al. | |

OTHER PUBLICATIONS

Branscombe M., "Searching for the Car Network's Natural Edge," Jun. 18, 2018, Internet Article, retrieved from the Internet URL: https://www.datacenterknowledge.com/print/167337, retrieved on Mar. 27, 2020, 5 pages.

Brown A., "Practical Digital Preservation," Dec. 1, 2011, 353 pages.

Duffy C.O., et al., "Fundamentals of Medium/Heavy Duty Commercial Vehicle Systems," Jones & Bartlett Learning, Jul. 27, 2015, 60 pages.

International Search Report and Written Opinion for International Application No. PCT/US2019/068312, dated Apr. 8, 2020, 11 pages.

Oliver G., et al., "Digital Curation", Second Edition, Apr. 1, 2016, 32 pages.

Seider C., et al., "Whitepaper—Serie Autonomes Fahren #03 Technische Voraussetzungen," Internet Article, Retrieved from the Internet URL: https://de.nttdata.com/files/2018-de-wp-autonomes-fahren-03-technische-vorraussetzungen.pdf, retrieved on Mar. 27, 2020, Nov. 8, 2018, 17 pages.

Seider C., et al., "Whitepaper—Serie Autonomes Fahren #03 Technische Voraussetzungen," Internet Article, Retrieved from the Internet URL: https://de.nttdata.com/-/media/NTTDataGermany/Files/2018-DE-WP-Autonomes-Fahren-03-Technische-Vorrau . . . , retrieved on Mar. 27, 2020, Nov. 8, 2018, 17 pages.

International Preliminary Report on Patentability, PCT/US2019/068312 dated Jan. 6, 2022.

* cited by examiner

AUTONOMOUS VEHICLE DATA MANAGEMENT PLATFORM

CROSS-REFERENCE TO RELATED APPLICATIONS

The present application is a continuation of U.S. patent application Ser. No. 16/456,620, filed Jun. 28, 2019, and entitled "AUTONOMOUS VEHICLE DATA MANAGEMENT PLATFORM," the disclosure of which is hereby incorporated by reference in its entirety and for all purposes.

TECHNICAL FIELD

The subject matter of this disclosure relates in general to the field of autonomous vehicles, and more particularly, to systems and methods for managing autonomous vehicle data.

BACKGROUND

An autonomous vehicle (AV) is a motorized vehicle that can navigate without a human driver. The AV can include a plurality of sensor systems, such as a camera sensor system, a Light Detection and Ranging (LIDAR) sensor system, and a Radio Detection and Ranging (RADAR) sensor system, among others. The AV may operate based upon sensor signals output by the sensor systems. For example, the sensor signals can be provided to a local computing system in communication with the plurality of sensor systems and a processor can execute instructions based upon the sensor signals to control one or more mechanical system of the AV, such as a vehicle propulsion system, a braking system, a steering system, and so forth.

In addition to sensor data for controlling the vehicle, the AV can collect various other types of data, such as battery or fuel consumption data, navigational data (e.g., geographical coordinates, routes, mapping data, etc.), traffic conditions, road conditions, weather conditions, and other data relating to the AV or its environment. If the AV is part of a ridesharing service, the AV can also collect passenger data (e.g., demographic data, passenger behavior data, etc.), trip data (e.g., pick-up and drop-off locations, fare, trip rating, etc.), client device data, and so forth. The AV can process some of its data "on-line" or in real-time or near real-time for immediate maneuvering of the vehicle. However, analysis of the AV data "off-line" or at a later time can also be critical for the safe, legal, and efficient operation of the vehicle.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
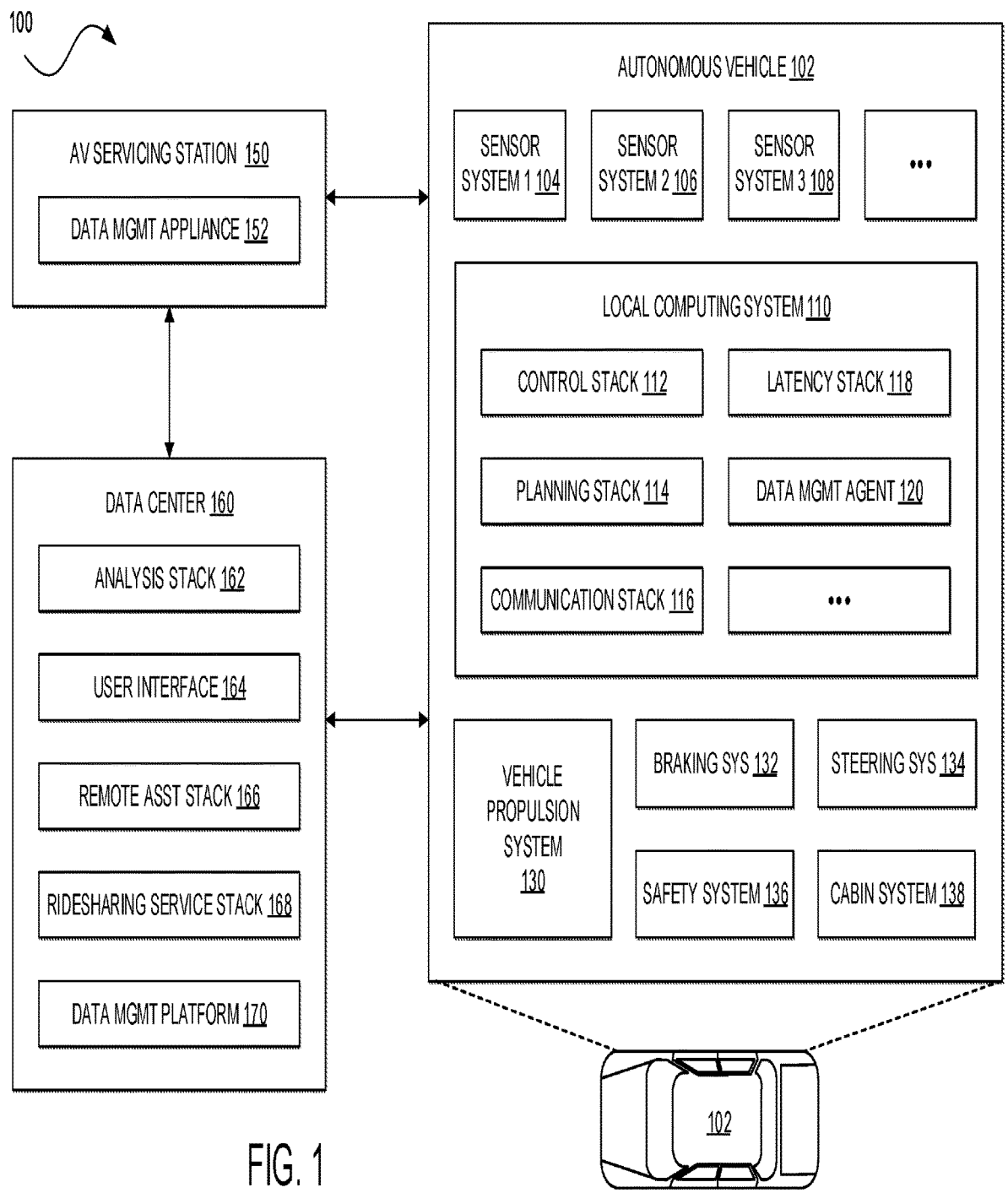
FIG. 1 illustrates an example of a system for an Autonomous Vehicle (AV) system in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

The present technology can involve the gathering and use of data available from various sources to improve quality and experience. The present disclosure contemplates that in some instances, this gathered data may include personal information. The present disclosure contemplates that the entities involved with such personal information respect and value privacy policies and practices.

The various types of data captured by an Autonomous Vehicle (AV) can have tremendous value in helping to operate the AV and related services. For example, AV data can be used to improve object classification (e.g., identifying different types of objects on the road, such as pedestrians, bicycles, emergency vehicles, etc.), event classification (e.g., identifying various driving situations, such as lane merges, double parked cars, unprotected left turns, near collisions, etc.), mapping and routing, maneuvering, passenger safety, passenger experience (e.g., smooth ride, comfortable cabin temperature, etc.), trip estimates (e.g., trip time, fare, etc.), battery power or fuel efficiency, and so forth. Further improvements can be achieved by taking advantage of the network effects of collecting AV data from a fleet of AVs. However, collection of AV data can be limited by the computing resources (e.g., processing, memory, storage, network bandwidth, etc.) available to individual AVs and a centralized repository (e.g., data center, cloud computing network, etc.) for the AV data. AVs typically have fewer computing resources, and real-time or near real-time operation of the AV can have priority for these resources. In addition, available network bandwidth can be highly unpredictable and especially scarce to the AVs and the centralized repository alike. A system for managing AV data should be scalable to support a variety of different computing environments having a high degree of variance in available computing resources.

Another challenge in collecting AV data can be the variable amount of time it takes to transfer data from individual AVs to a centralized repository. An AV fleet may operate according to certain dispatching or scheduling rules, such as maximizing utilization of the AV fleet, optimizing pick-up and drop-off routes, fulfilling passenger preferences for the type of AV or service amenities, and so forth. A system for managing AV data should be flexible enough to ingest data over different lengths of time to accommodate these dispatching and scheduling rules. In addition, the AV should be able to initiate data transfer at one site and then resume later at a different site.

Other constraints in collecting AV data can be imposed by security requirements, data integrity requirements, and battery power or fuel requirements, among other rules and requirements. A system for managing AV data should be able to transfer data securely, accurately, and quickly (e.g., within the time it takes to recharge or refuel the AV).

Various embodiments of the present disclosure can address the above and other challenges of managing AV data. In particular, an AV data management platform can be provided that is highly reliable, scalable, and flexible. In some embodiments, an AV can partition raw data units captured by its sensors, mechanical systems, and other instruments into ingestion objects for consumption by other computing systems, such as computing systems incorporated by other AVs, AV servicing stations, data centers (e.g., private enterprise or co-location networks, Cloud Service Provider (CSP) networks, hybrid clouds, multi-clouds, etc.), and so on. The AV can apply one or more transformations to the ingestion objects to generate transformed objects and associated manifests, and store the transformed objects and associated manifests in local storage. Each manifest can include a history of how its corresponding raw data units were partitioned and how its corresponding ingestion object was transformed and a data integrity value (e.g., checksum, hash value, error detection code, digital signature, Cyclic Redundancy Check (CRC), etc.) representing its corresponding transformed object. In some embodiments, the AV can offload first copies of the manifests in real-time or near real-time to one or more data center computing systems. At a later time, the AV can offload second copies of the manifests and initiate offloading of the transformed objects to one or more AV servicing station computing systems when the AV receives servicing (e.g., recharging or refueling, data uploading, maintenance, etc.) at the station. The one or more AV servicing station computing systems can upload the second copies of manifests and initiate uploading of the transformed objects to the one or more data center computing systems. The one or more data center computing systems can attempt to reconcile the first copies of the manifests with corresponding second copies of the manifest. If the copies of the manifests match, and the AV completes offloading the corresponding transformed objects, then the one or more AV servicing station computing systems can notify the AV that it is safe erase the manifests and corresponding transformed objects from the AV's local storage. If the copies of the manifests cannot be reconciled and a Service Level Agreement (SLA) applicable to the transformed objects is violated, then the AV can be docked for further diagnosis. If the copies of the manifests cannot be reconciled and no SLA is applicable, then error information regarding offloading or uploading the transformed objects can be annotated and the transformed objects can be discarded.

Numerous benefits can flow from the data management platform. By receiving the first copies of manifests in real-time or near real-time (or at least before the transformed objects have completed offloading from the AV to the AV servicing station), the data management platform can learn whether the AV is having issues with its data processing pipeline (e.g., capturing raw data, partitioning the raw data into ingestion objects, transforming the ingestion objects, determining manifests for the transformed objects, offloading first copies of the manifests to the data center, offloading second copies of the manifests and the transformed objects to the servicing station, etc.). If the error is serious enough (e.g., violates an SLA), immediate action can be taken, such as docking the AV at a servicing station for further diagnosis.

When the AV later attempts to offload its data at a servicing station, the servicing station can upload the second copies of manifests to the data center. The second copies of manifests can arrive while offloading of the transformed objects is still in progress. This can be implicit because of the sizes of the manifests are small relative to the transformed objects, or this can be explicitly configured. Reconciliation of pairs of corresponding manifests can quickly determine whether the AV is having data issues while the AV is still within the servicing station Thus, the issues can be directly addressed to prevent further data loss if warranted (e.g., violates an SLA).

On the other hand, if the first and second copies of manifests match, data integrity has been assured. After the servicing station validates the offloaded transformed objects based on the data integrity values set forth in corresponding manifests, the servicing station can notify the AV that it is safe to erase the offloaded transformed objects and corresponding manifests to free up local storage. In addition, the data center and/or the servicing station can optimize when to upload the transformed objects to take advantage of times when there is less network congestion and/or times when CSP costs are minimal.

The design of the data management platform also enhances flexibility of the overall AV system. The system is horizontally scalable at each level of the data hierarchy, enabling for capacity to be increased based on the respective data demands at the fleet level, servicing station level, and data center level. The data management platform can support servicing stations and AVs having disparate resources. Data offloading by the AV may no longer a bottleneck during servicing; the AV can come and go from servicing station to servicing station as soon it has been recharged or refueled, enabling maximization of the AV's utilization during busier times.

Another benefit of the data management platform is its adaptability. Each stage of the data management process is configurable by the AV, the AV servicing station, and/or the data center and can be adjusted depending on their circumstances. For example, the AV, servicing station, and/or data center can dynamically configure a size range of ingestion objects to optimize between processing, memory, storage, or network bandwidth utilization, the time the AV spends at the servicing station, and so forth. Likewise, the AV, servicing station, and/or data center can dynamically tune what transformations are performed on ingestion objects to balance resource utilization. The transformations can include missing value processing, deduplication, outlier or noise processing, generalization, rescaling, aggregation, discretization, encryption, decryption, or a non-linear transformation. Numerous other functions and advantages are described and suggested below in accordance with the various embodiments.

Turning now to the drawings, FIG. 1 illustrates an example of a system for an AV system 100. One of ordinary skill in the art will understand that, for the AV system 100 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the AV system 100 includes an AV 102, an AV servicing station 150, and a data center 160. The AV 102, the AV servicing station 150, and the data center 160 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The AV 102 can navigate about roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measuring Units (IMUs) (e.g., accelerometers, gyroscopes, magnetometers, etc.), image sensors (e.g., still image cameras, video cameras, etc.), light sensors (e.g., LIDAR systems, ambient light sensors, infrared sensors, etc.), Global Positioning System (GPSs), RADAR systems, audio sensors (e.g., microphones, Sound Navigation and Ranging (SONAR) systems, ultrasonic sensors, etc.), speedometers, tachometers, odometers, altimeters, tilt sensors, impact sensors, seat occupancy sensors, open/closed door sensors, temperature sensors, pressure sensors, rain sensors, and so forth. In this example, the sensor system 104 can be a RADAR system, the sensor system 106 can be a first image sensor system (e.g., still image or video cameras), and the sensor system 108 can be a second image sensor system (e.g., LIDAR system). Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., GUIs, VUIs, etc.) for controlling certain aspects of the mechanical systems 130-138.

The AV 102 can additionally include a local computing system 110 that is in communication with the sensor systems 104-108, the mechanical systems 130-138, the AV servicing station 150, and the data center 160, among other systems. The local computing system 110 can include one or more processors and memory including instructions that can be executed by the one or more processors. The instructions can make up one or more software stacks or systems responsible for controlling the AV 102, communicating with the AV servicing station 150, the data center 160, and other systems, receiving inputs from users, logging metrics collected by the sensor systems 104-108 and users, and so forth. In this example, the local computing system 110 includes a control stack 112, a planning stack 114, a communication stack 116, a latency stack 118, and an AV data management platform agent 120, among other stacks and systems.

The control stack 112 can manage the operation of the vehicle propulsion system 130, the braking system 132, the steering system 134, the safety system 136, and the cabin system 138. The control stack 112 can receive sensor signals from the sensor systems 104-108 as well as communicate with other stacks of the local computing system 110 to effectuate operation of the AV 102. In some embodiments, the control stack 112 may carry out operations in concert with one or more other stacks or systems of the AV 102.

The planning stack 114 can determine how to maneuver or operate the AV 102 safely in its environment. For example, the planning stack 114 can be provided with the location, speed, and direction of the AV 102, map or route information, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another. The planning stack 114 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 114 can select from multiple backup plans to carry out. For example, while preparing to change lanes to turn right at an intersection, another vehicle may aggressively cut into the destination lane, making the lane change unsafe. The planning stack 114 would have already determined an alternative plan for such an event, and upon the event occurring, help to direct the AV 102 to go around the block instead of blocking its current lane while waiting for an opening to change lanes. In some embodiments, the planning stack 114 can be a part of the control stack 112.

The communication stack 116 can transmit and receive signals between the stacks and systems of the AV 102 and between the AV 102, the AV servicing station 150, the data center 160, and other remote systems. The communication stack 116 can enable the local computing system 110 to exchange information remotely over a network, such as through an antenna array or interface that can provide municipal Wi-Fi, cellular (e.g., Third Generation (3G), Fourth Generation (4G), Long-Term Evolution (LTE), 5th Generation (5G), etc.), or other wireless Wide Area Network (WAN) or remote connection. The communication stack 116 can also facilitate local exchange of information, such as through a wired connection (e.g., a user's mobile computing device docked in an in-car docking station or connected via Universal Serial Bus (USB), the local computing system 110, etc.) or a local wireless connection (e.g., Wireless Local Area Network (WLAN), Bluetooth®, infrared, etc.).

The latency stack 118 can utilize timestamps on communications to and from the data center 160 to determine if a communication has been received from the data center 160 in time to be useful. For example, when a stack of the local computing system 110 requests feedback from the data center 160 on a time-sensitive basis, the latency stack 118 can determine if a response was timely received from the data center 160 as information can quickly become too stale to be actionable. When the latency stack 118 determines that a response has not been received within a threshold, the latency stack 118 can enable other stacks or systems of the AV 102 or a user to make necessary decisions or to provide the needed feedback.

The AV data management platform agent 120 can retrieve raw AV data stored locally by the AV, process the raw AV data so that it is suitable for transfer to the AV servicing station 150, and generate manifests to ensure the processed AV data is ultimately received by the data center 160. In some embodiments, the AV data management platform agent 120 can execute as a part of a recharging or refueling process or other AV servicing. An example of an implementation of the AV data management platform agent 120 is discussed in further detail below with respect to FIG. 2.

The AV servicing station 150 can be a location for providing various servicing for the AV 102, such as refueling or recharging the AV, offloading AV data, recalibrating sensors, performing diagnostics and maintenance, and the like. The AV servicing station 150 can include one or more computing systems, including an AV data management platform appliance 152. The AV data management platform appliance 152 can receive AV data offloaded from the AV 102 and transmit the AV data to the data center 160. An example of an implementation of the AV data management appliance 152 is discussed in further detail with respect to FIG. 2.

The data center 160 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 160 can include one or more computing systems remote to the local computing system 110 and the AV servicing station 150 for managing a network of AV servicing stations and a fleet of AVs. In some embodiments, the data center 160 can support a ridesharing service, a delivery service, a remote/roadside assistance service, street services (e.g., street view, street patrol, street cleaning, street metering, parking reservation, etc.), and the like.

The data center 160 can send and receive various signals to and from the AV 102 and the AV servicing station 150. These signals can include reporting data for training and evaluating machine learning algorithms, roadside assistance requests, software updates, ridesharing pick-up and drop-off instructions, and so forth. In this example, the data center 160 includes an analysis stack 162, a user interface 154, a remote assistance stack 156, a ridesharing service stack 158, and an AV data management platform 170, among other stacks, platforms, and systems.

The analysis stack 162 can receive data from the AV 102 and/or the AV servicing station 150, and analyze the data to train or evaluate machine learning algorithms for operating the AV 102. The analysis stack 162 can also perform analysis pertaining to data associated with one or more errors or constraints reported by the AV 102 and/or the AV servicing station 150.

The user interface 154 can present metrics, video, pictures, sounds, and so forth that are reported from the AV 102 and/or the AV servicing station 150 to a human operator of the data center 160. The user interface 154 can further receive input instructions from a human operator that can be sent to the AV 102 and/or the AV servicing station 150.

The remote assistance stack 156 can generate and transmit instructions regarding the operation of the AV 102. For example, in response to an output of the analysis stack 162 or the user interface 154, the remote assistance stack 156 can prepare instructions for one or more stacks or systems of the AV 102.

The ridesharing service stack 158 can interact with client computing devices (not shown), such as servers, desktops, laptops, tablets, smartphones, smart wearable devices (e.g., smart watches, smart eyeglasses or other Head-Mounted Displays (HMDs), smart ear pods or other smart in-ear, on-ear, or over-ear devices, etc.), gaming systems, or other general purpose computing devices for supporting a ridesharing service. The client computing devices may be users' mobile computing devices or computing devices integrated with the AV 102 (e.g., the local computing system 110). The ridesharing service stack 158 can receive requests to be picked up or dropped off from the client computing device and dispatch the AV 102 for the trip.

Figure 2:
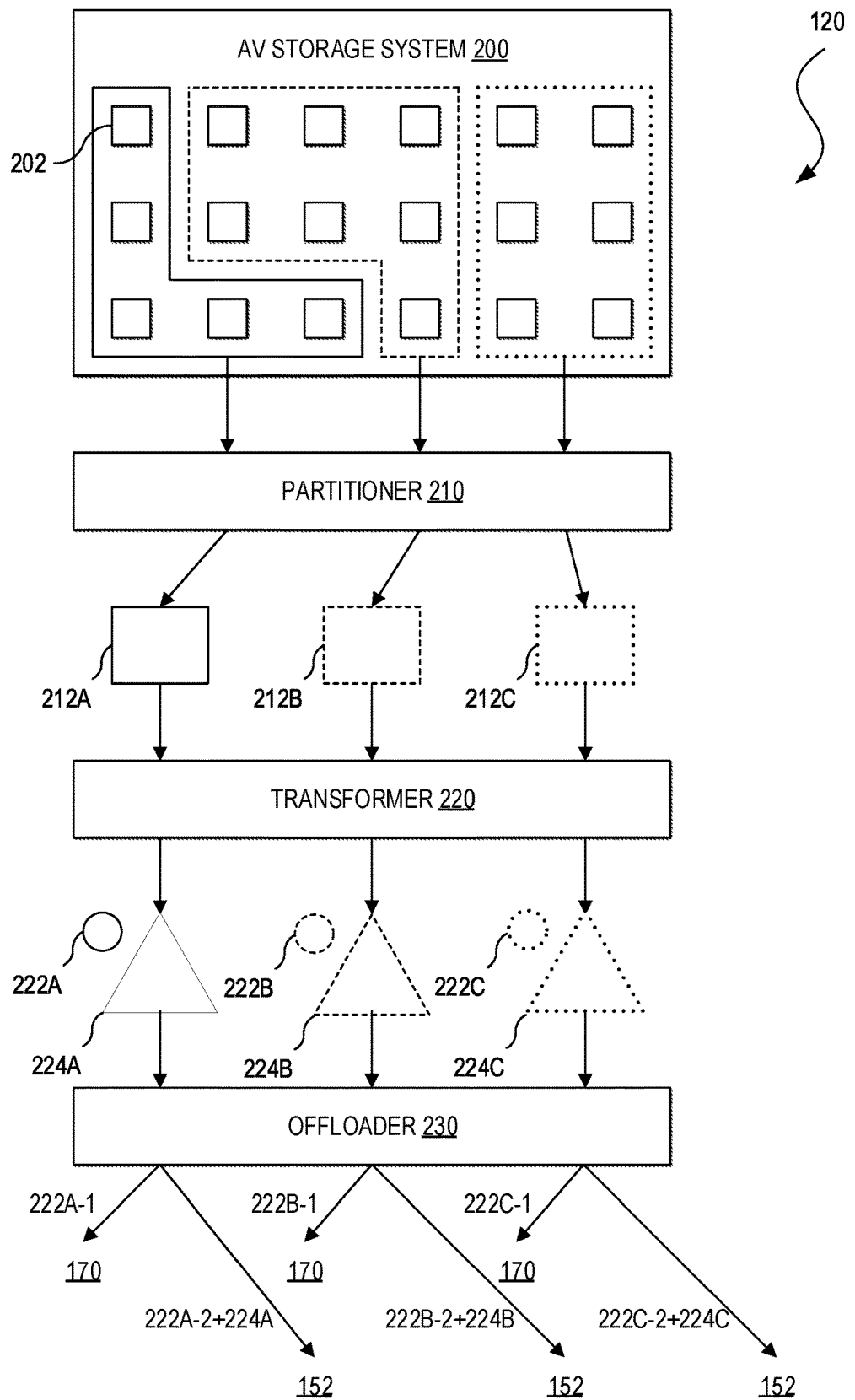
FIG. 2 illustrates an example of an AV data management platform agent in accordance with an embodiment.

FIG. 2 illustrates an example of an implementation of the AV data management platform agent 120 for the AV 102. The AV data management platform agent 120 can include an AV storage system 200, a partitioner 210, a transformer 220, and an offloader 230. The AV storage system 200 can comprise a collection of data units (e.g., files, blocks, objects, etc.) representing various types of raw data captured by the AV 102, such as sensor data, battery or fuel consumption data, navigational data (e.g., geographical coordinates, routes, mapping data, etc.), traffic conditions, road conditions, weather conditions, and other data relating to the AV 102 or its environment. In some embodiments, the data units 202 can also represent passenger data (e.g., demographic data, passenger behavior data, etc.), trip data (e.g., pick-up and drop-off locations, fare, trip rating, etc.), client device data, and other data relating to the services provided by the AV 102 (e.g., delivery service, remote/roadside assistance service, street view service, street patrol service, street cleaning service, street metering service, parking reservation service, etc.). The data units 202 may physically reside on a hard disk drive (HDD), solid state drive (SSD), or other suitable type of storage media.

The partitioner 210 can be a hardware and/or software component that accesses the data units 202 and partitions them into a collection of ingestion objects 212A, 212B, and 212C (collectively, 212) in which each ingestion object comprises one or more data units that may be logically related to one other. Although the partitioner 210 is shown aggregating multiple data units into a single ingestion object in this example, the partitioner 210 can additionally or alternatively segment a single data unit into multiple ingestion objects in other embodiments.

In some embodiments, the operation of the partitioner 210 can be dynamically configured (e.g., by the AV 102, the AV servicing station 150, the data center 160, etc.) based on a current state of the AV 102, the AV servicing station 150, and/or the data center 160. For example, the partitioner 210 can be adjusted to generate the ingestion objects to be a size depending on the current network bandwidth of the AV 102, the AV servicing station 150, and/or the data center 160.

The transformer 220 can be hardware and/or software component that processes the ingestion objects 212 to generate manifests 222A, 222B, and 222C (collectively, 222) corresponding respectively to transformed objects 224A, 224B, and 224C (collectively, 224). The transformer 220 can perform various transformations on the ingestion objects 212, such as missing value processing (e.g., ignoring data points having missing feature values, substituting missing values with dummy values, mean, mode, median, etc.), deduplication (e.g., deleting or aggregating duplicate or redundant or insignificant data points), outlier or noise processing (e.g., binning, regression, deleting outliers or noise, etc.), generalization (e.g., converting specific data points to less specific data points, such as translating a Global Positioning System (GPS) coordinate to a street address, city, state, country, etc.), rescaling (e.g., normalization, standardization, min-max scaling, etc.), aggregation (e.g., summarizing or consolidating data, such as combining multiple instances of sensor detected every second for ten minutes into a single instance representing a ten-minute span), discretization (e.g., converting continuous values to discrete values, binning, binarization, etc.), encryption, decryption, non-linear transformations (e.g., mapping data values to a uniform distribution, Gaussian distribution, etc.), and so forth.

The manifests 222 can describe the history of the transformed objects 224, such as providing a listing of the raw data units 202 that make up the ingestion objects 212 from which the transformed objects 224 originated, the transformation logic that was applied to the ingestion objects 212, the results and performance of the transformations, and so forth. The manifests 222 can also include checksums, hashes, error detection codes, digital signatures, CRCs, or other data verifying the integrity of the transformed objects 224. In some embodiments, the manifests 222 may be small in size (e.g., Kilobytes) relative to the transformed objects 224 (e.g., Gigabytes).

In some embodiments, the operation of the transformer 220 can also be dynamically configured (e.g., by the AV 102, the AV servicing station 150, the data center 160, etc.) based on a current state of the AV 102, the AV servicing station 150, and/or the data center 160. For example, the transformer 220 can be adjusted to perform certain transformations or to skip certain transformations depending on the processing and memory resources available to the AV 102, the AV servicing station 150, and/or the data center 160, such as when there may be higher priority processes executing concurrently.

The offloader 230 can be hardware and/or software component that transmits first copies of the manifests 222A-1, 222B-1, and 222C-1 (collectively, 222-1) directly to the data center 160 and second copies of the manifests 222A-2, 222B-2, and 222C-2 (collectively, 222-2) and the respectively corresponding transformed objects 224A, 224B, and 224C to the AV servicing station 150. In some embodiments, after the offloader 230 has successfully transmitted the first copies of the manifests 222-1 directly to the data center 160 and the second copies of the manifests 222-2 and the corresponding transformed objects 224 to the AV servicing station 150, the offloader 230 can free up the data units 202 corresponding to the transformed objects 224 stored in the AV storage system 200 (e.g., delete the data units, mark the data units so they can be overwritten, etc.).

Figure 3:
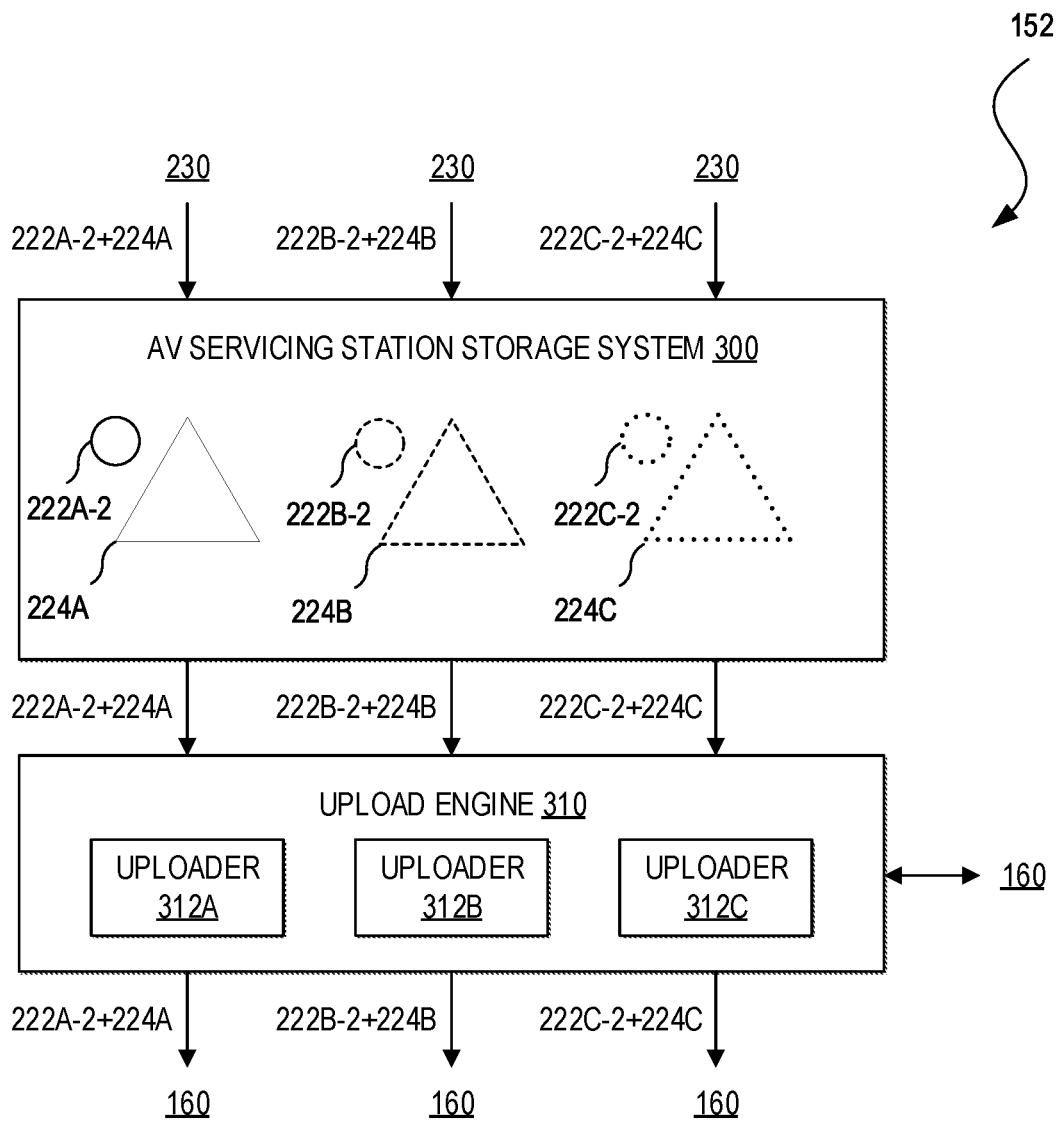
FIG. 3 illustrates an example of an AV data management platform appliance in accordance with an embodiment.

FIG. 3 illustrates an example of an implementation of the AV data management platform appliance 152 for the AV servicing station 150. The AV data management platform appliance 152 can include a storage system 300 and an upload engine 310. The storage system 300 can be similar to the AV storage system 200 in many respects but may be capable of storing more data than the AV 102 because the storage system 300 may be shared by more than one AV. The storage system 300 can receive the manifests 222-2 and their corresponding transformed objects 224 from the offloader 230 and transmit them to the upload engine 310. Some advantages of this design are that the AV can be outfitted with less storage because of the ability to offload AV data to the AV servicing station 150, AVs can have large offload rates even during peak hours because the AVs can offload AV data over a local network connection, and offload rates can be independent of the network bandwidth between the AV servicing station 150 and the data center 160.

The upload engine 310 can be a hardware and/or software component that can monitor the storage system 300 and move the manifests 222-2 and their corresponding transformed objects 224 from the storage system 300 to the data center 160. In some embodiments, the upload engine 310 can be designed to include multiple uploader processes 312A, 312B, and 312C (collectively, 312) that can run concurrently in the same AV servicing station without interfering with each other. In this example, the upload engine 310 may be managed from the data center 160 to coordinate among the uploader processes 312 to write AV data to the data center 160 as discussed further below with respect to FIG. 4 and elsewhere in the present disclosure.

As discussed, the second copies of the manifests 222-2 are likely to arrive at the data center 160 before the AV 102 completes uploading the associated transformed objects 224 because of their relative sizes. Thus, if there is a data error, the AV 102 is still located at the AV servicing station 150 so that the AV 102 can try re-uploading the transformed objects 224 again or, if the error is more significant, the AV 10 can remain at the AV servicing station 150 so that the error may be addressed without further data loss. If the upload engine 310 successfully transmits the AV data to the data center 160, the upload engine 310 can erase the manifests 222 and their corresponding transformed objects 224 from the storage system 300 or enable them to be overwritten.

In some embodiments, the operation of the upload engine 310 can also be dynamically configured (e.g., by the AV 102, the AV servicing station 150, the data center 160, etc.) based on a current state of the AV 102, the AV servicing station 150, and/or the data center 160. For example, the upload engine 310 can be adjusted to minimize CSP costs by running the uploader processes 312 during periods of time when CSP networking costs are at their lowest (e.g., off-peak or non-business hours) and/or hibernating the uploader processes 312 during periods of time when CSP networking costs are at their highest.

Figure 4:
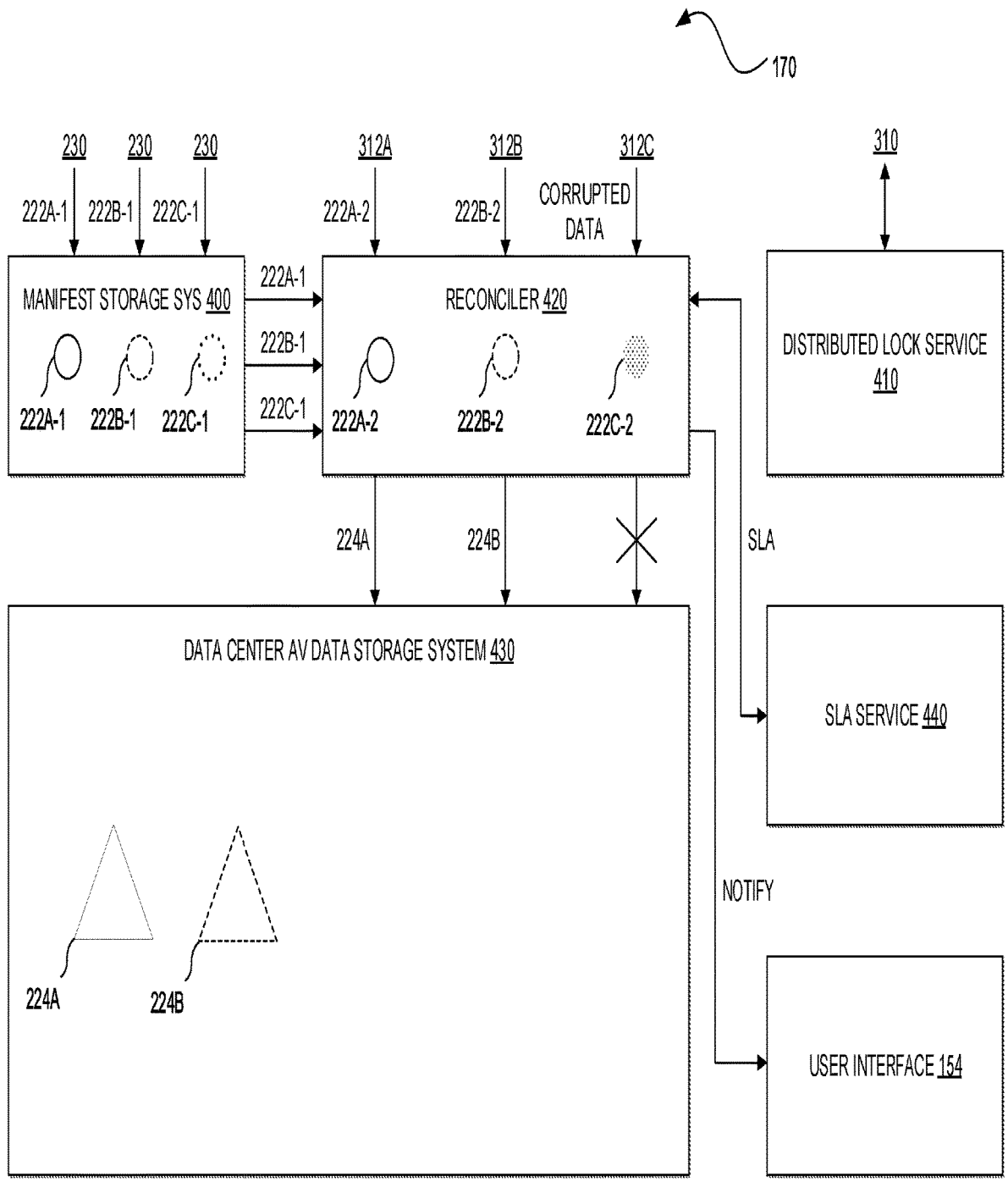
FIG. 4 illustrates an example of an AV data management platform in accordance with an embodiment.

FIG. 4 illustrates an example of an implementation of the AV data management platform 170. The AV data management platform 170 can include a manifest storage system 400, a distributed lock service 410, a reconciler 420, an AV data storage system 430, an SLA service 440, and the user interface 154. The manifest storage system 400 and the AV data storage system 430 can be similar to the AV storage system 200 and/or the storage system 300 in many respects but are capable of storing several degrees of magnitude more manifests and transformed objects, respectively, than the AV 102 and/or the AV servicing station 150 because the manifest storage system 400 and the AV data storage system 430 may be shared by a network of AV servicing stations and a fleet of AVs and store AV data over lengthier periods of time (e.g., months or years versus hours). But the AV data storage system 430 is typically capable of storing more data than the manifest storage system 400 because the manifests 222 are generally smaller in size than the transformed objects 224. In this example, the manifest storage system 400 can receive the manifests 222-1 from the offloader 230 in real-time or near real-time, and register them.

The distributed lock service 410 can be a hardware and/or software component that allows its clients (e.g., the uploader processes 312) to synchronize their activities and to agree on basic information about their environment. The distributed lock service 410 can comprise a server cluster and a library to which the uploader processes 312 can link. The server cluster can comprise a small set of servers (e.g., 5), which may be referred to as replicas and which may be configured to reduce the likelihood of correlated failure (e.g., located in different racks). The replicas can use a distributed consensus protocol (e.g., Paxos) to elect a master, which is the replica that can obtain votes from the majority of the replicas and can promise that those replicas will not elect a different master for an interval of time (e.g., a few seconds) (sometimes referred to as a master lease). The master lease can be periodically renewed by the replicas if the master continues to win a majority of the votes. The replicas can maintain copies of a simple database but only the master may initiate reads and writes of this database. Other replicas may copy updates from the master, which can be sent using the consensus protocol.

The uploader processes 312 can find the master by sending master location requests to the replicas via Domain Name System (DNS). Non-master replicas can respond to these requests by returning the identity of the master. Once an uploader process has located the master, the uploader process can direct all requests to the master until the master ceases to respond or indicates that it is no longer the master. Write requests can be propagated via the consensus protocol to the replicas, and the write requests can be acknowledged when the write has reached a majority of replicas in the cluster. Read requests can be satisfied by the master, and should be safe if the master lease has not expired. If a master fails, the other replicas can run the election protocol when their master leases expire.

The distributed lock service 410 can expose a file system similar to UNIX® in which each file and directory can operate as a lock such that either one uploader process can hold it in write mode, or any number of the uploader processes 312 can hold the lock in read mode. The uploader processes 312 can subscribe to a range of events when they create a handle. These events can be delivered to the uploader processes asynchronously via an up-call from the client library. Some examples of events include file contents modified, child node added, removed, or modified, and the master failed over, among others.

The reconciler 420 can be a hardware and/or software component that receives the manifests 222-1 from the manifest storage system 400 and the manifests 222-2 from the uploader processes 312, and attempt to reconcile them. For example, the reconciler 420 can subscribe to the manifest registry and attempt to match the manifests 222-1 upon arrival of the manifests 222-2. When then there is a match, such as with the manifests 222A-1 and 222A-2 and 222B-1 and 222B-2, then the AV storage system 430 can store their associated transformed object s 224A and 224B upon completing upload.

If there is no match, as in the case between the manifest 222C-1 and 222C-2, then the AV data management platform 170 may request the AV servicing station 150 re-upload the manifest 222C-1. If after a number of attempts to re-upload the manifest 222C-2 has failed, there may be a more serious problem. To ensure that the error is consequential enough to keep the AV 102 at the servicing station, the reconciler 420 can request for an SLA from the SLA service 440 corresponding to the current circumstances. In general, an SLA is a contract between a service provider and a customer setting the terms by which the provider makes its services available to the customer. The SLA can define the service or services provided or requested and service level parameters to ensure a specified Quality of Service (QoS) level agreed to by the parties, among other terms. In this example, the SLA service 440 can identify situations where data errors are critical. For instance, if the transformed object 222C-2 corresponds to data captured by a sensor necessary to operate the AV 102 safely, then the AV data management platform 170 can dock the AV 102 at the AV servicing 150 for further diagnosis. In this case, the error may be insignificant such that the AV data management platform 170 can discard the transformed object 224C but generate a notification for transmission to the user interface 154 to follow up at a later time.

In addition to controlling the circumstances under which it may be imperative to keep the AV 102 in the AV servicing station 150, the SLA service 440 can also maintain more conventional SLAs, such as high-level criteria including availability, reliability, security, pricing, performance, and other measures of broad applicability, and lower-level criteria, such as response time, throughput, bandwidth, latency, jitter, error rate, downtime per week, Mean Time to Repair (MTTR), Mean Time Between Failure (MTBF), and other measures of more specific applicability. For example, an SLA can set forth the maximum length of time between receiving a first copy of a manifest and a second copy of the manifest. The reconciler 420 can monitor this SLA provision and generate a notification for transmission to user interface 154 when the SLA provision is violated.

Figure 5A:
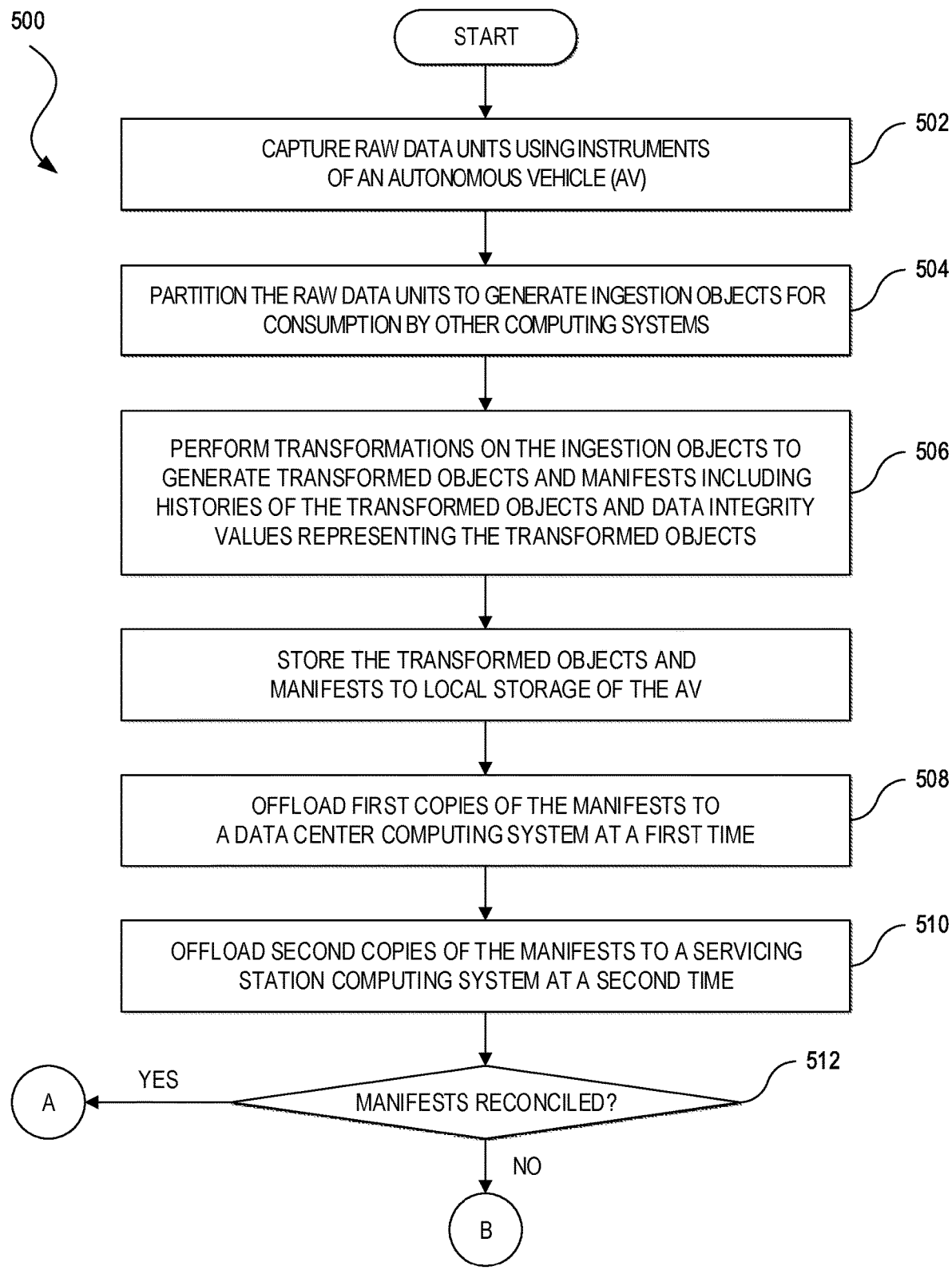
FIGS. 5A and 5B illustrate an example of a process for managing AV data in accordance with an embodiment.
Figure 5B:
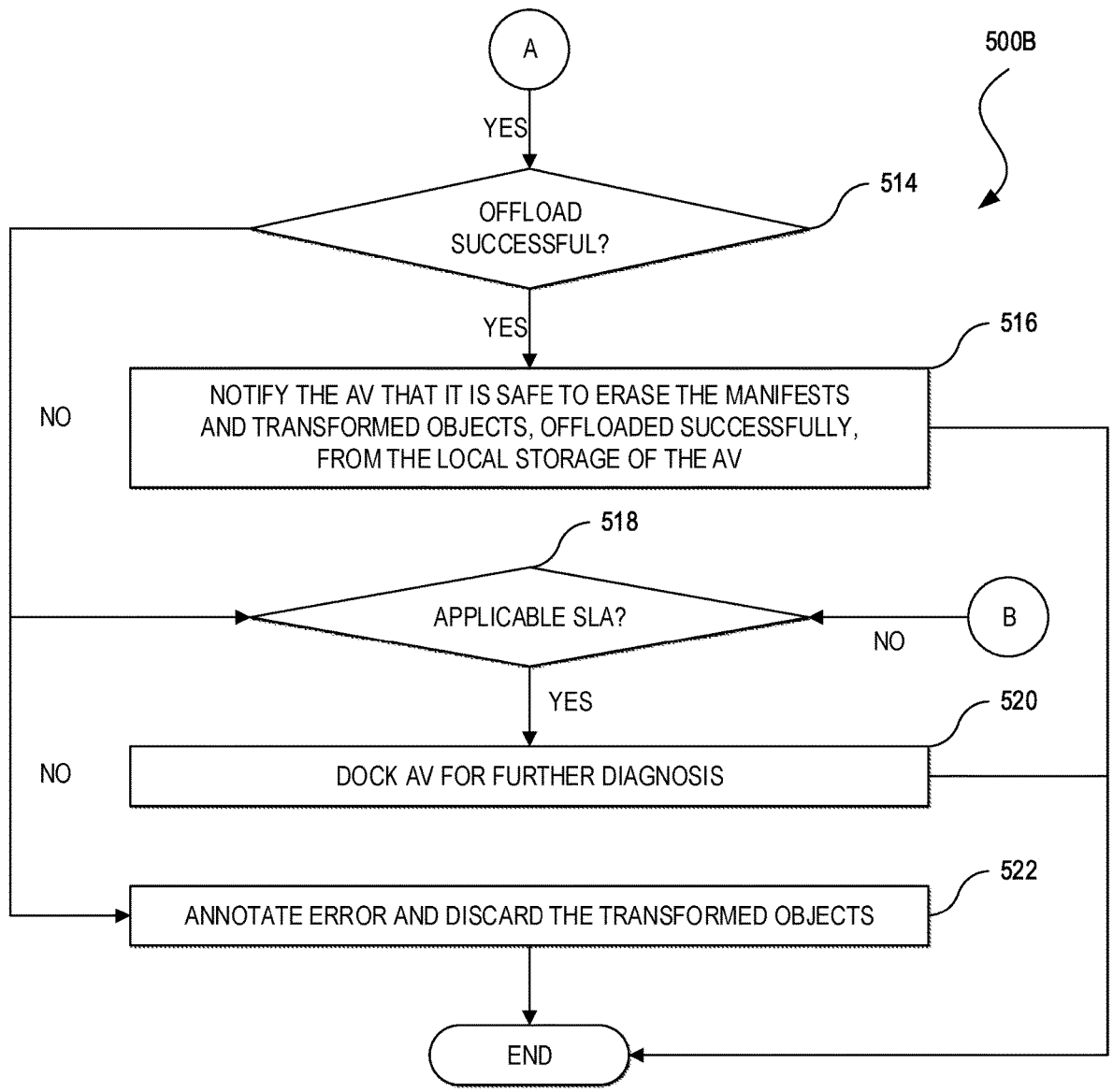

FIGS. 5A and 5B illustrate an example of a process 500 for managing AV data. One of ordinary skill will understood that, for any flow, method, or process discussed herein, there can be additional, fewer, or alternative steps performed in similar or alternative orders, or in parallel, within the scope of the various embodiments unless otherwise stated. The process 500 can be performed at least in part by the AV 102, the AV data management platform agent 120, the AV servicing station 150, the AV data management platform appliance 152, the data center 160, and/or the AV data management platform 170.

The process 500 can begin with the AV 102 capturing raw data (e.g., sensor data, battery or fuel consumption data, navigational data, traffic conditions, road conditions, weather conditions, or other data relating to the AV 102) using one or more its instruments (e.g., sensors, actuators, mechanical systems, computing systems, etc.). In some embodiments, the raw data units can also include passenger data (e.g., demographic data, passenger behavior data, etc.), trip data (e.g., pick-up and drop-off locations, fare, trip rating, etc.), client device data, and other data relating to the services provided by the AV 102 (e.g., delivery service, remote/roadside assistance service, street view service, street patrol service, street cleaning service, street metering service, parking reservation service, etc.).

At step 504, the AV 102 can partition the raw data into one or more ingestion objects 212 for consumption by a separate computing system, such as a computing system incorporated by another AV, an AV servicing station, a data center, and so forth. In some cases, the AV 102 can combine multiple raw data units to generate a single ingestion object. Alternatively or in addition, the AV 102 can divide a single raw data unit into multiple ingestion objects. In some embodiments, partitioning the raw data units can be dynamically configured based on a current state of the AV 102, the AV servicing station 150, and/or the data center 160. For example, partitioning can be adjusted to generate the ingestion objects to be a size depending on the current network bandwidth of the AV 102, the AV servicing station 150, and/or the data center 160.

The process 500 can proceed to step 506 in which the AV 102 can perform one or more transformations on the ingestion objects 212 to generate one or more transformed objects 224 and manifests 222. For example, the AV 102 can perform at least one of missing value processing (e.g., ignoring data points having missing feature values, substituting missing values with dummy values, mean, mode, median, etc.), deduplication (e.g., deleting or aggregating duplicate or redundant or insignificant data points), outlier or noise processing (e.g., binning, regression, deleting outliers or noise, etc.), generalization (e.g., converting specific data points to less specific data points, such as translating a Global Positioning System (GPS) coordinate to a street address, city, state, country, etc.), rescaling (e.g., normalization, standardization, min-max scaling, etc.), aggregation (e.g., summarizing or consolidating data, such as combining multiple instances of sensor detected every second for ten minutes into a single instance representing a ten-minute span), discretization (e.g., converting continuous values to discrete values, binning, binarization, etc.), encryption, decryption, non-linear transformations (e.g., mapping data values to a uniform distribution, Gaussian distribution, etc.), and so forth.

The manifests 222 can describe the history of the transformed objects 224, such as listing the raw data units 202 that make up the ingestion objects 212, the transformations performed on the ingestion objects 212, the results and performance of the transformations, and so forth. The manifests 222 can also include checksums, hashes, or other data verifying the integrity of the transformed objects 224. In some embodiments, the transformations performed on the ingestion objects 212 can be dynamically configured. For example, certain transformations may be performed or skipped based on the processing and memory resources available to the AV 102, the AV servicing station 150, and/or the data center 160, such as when there may be higher priority processes executing concurrently.

At step 508, the AV 102 can offload first copies of the manifests 222 to the data center 160 at a first time (e.g., in real-time or near real-time). By receiving the first copies of manifests 222 in real-time or near real-time, the AV 102 and/or the data center 160 can immediately learn whether the AV 102 is having issues with its data processing pipeline and address the problems if they are significant (e.g., violate an SLA).

At step 510, the AV 102 can receive servicing at the AV servicing station 150 (e.g., recharge or refuel, maintenance, offload its locally stored data, etc.). The locally stored data can include second copies of the manifests 222 and the transformed objects 224. When the AV 102 offloads its data at the AV servicing station 150, the servicing station can upload the second copies of manifests 222 to the data center 160 such that the second copies may arrive while offloading is still in progress. This can be advantageous if the AV 102 is having data issues yet remains at the servicing station so that any issues can be directly addressed.

At decision block 512, the data center 160 can attempt to reconcile corresponding pairs of copies of the manifests 222. If the corresponding pairs of manifests 222 match, then the process 500 can proceed to decision block 514 where it can be determined whether offloading of the transformed objects 224 completed successfully. If so, at step 516, the AV servicing station 150 can notify the AV 102 that it is safe to erase the manifests 222 and transformed objects 224 that have successfully been offloaded, from local storage. A benefit of this approach is that because data integrity has been assured, the AV data management platform 170 has the flexibility of when to upload the transformed objects 224. For example, the AV servicing station 150 and/or the data center can schedule uploading of the transformed objects 224 at any time, including times after the AV 102 has left the AV servicing station 150, times when there is less network congestion, and/or times when CSP costs are minimal.

If instead the manifests cannot be reconciled, then the process 500 may continue to decision block 518 in which it can be determined whether an SLA applies to the current situation. For example, there can be SLAs based on the types of data corresponding to the transformed objects 224. If the transformed objects 224 correspond to sensors critical for the operation of the AV, it may be prudent to define an SLA that docks the AV 102 for further diagnosis under these circumstances. As another example, there can be SLAs requiring the transformed objects 224 to be uploaded by a certain time after they have been generated. As yet another example, there can be SLAs based on the number of offloading or uploading errors related to the AV 102. If there is an applicable SLA, then the process 500 can continue to step 520 in which the AV can be docked for further diagnosis and process can conclude. If there is no applicable SLA, then the process 500 can continue to step 522 in which the AV data management platform 170 can annotate the error and discard the transformed object 224 and the process 500 can conclude.

Figure 6A:
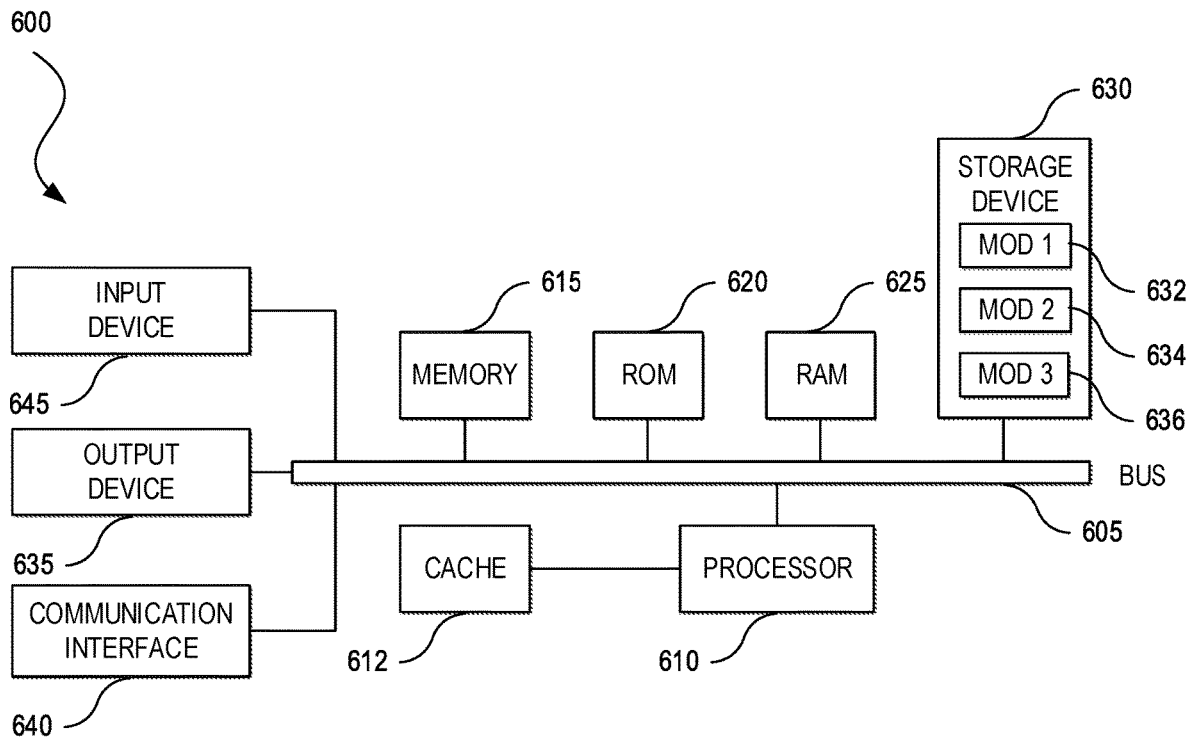
FIGS. 6A and 6B illustrate examples of computing systems in accordance with some embodiments.
Figure 6B:
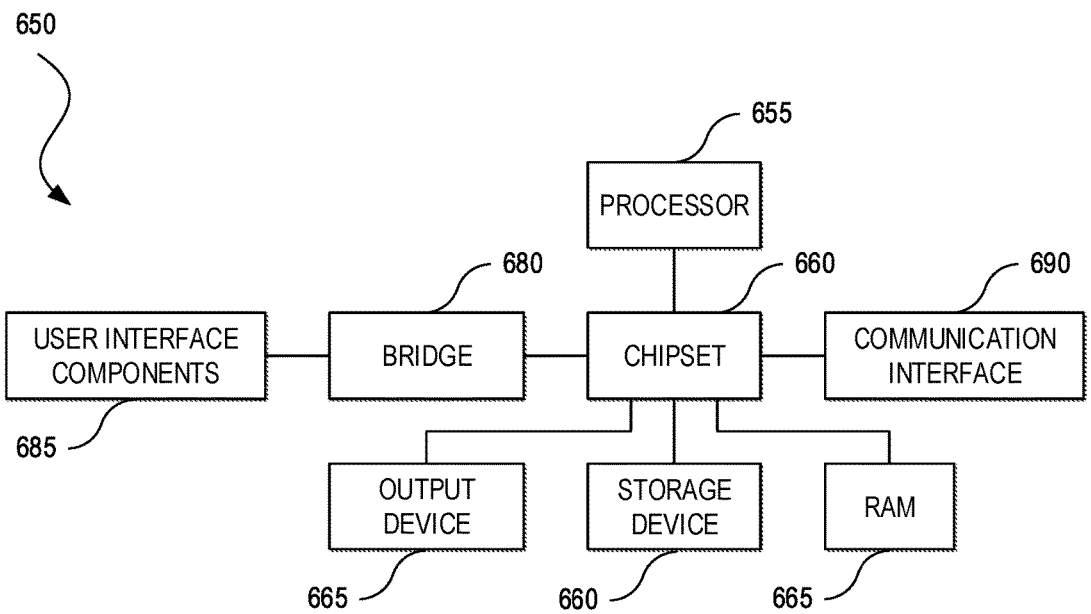

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:
1. A computer-implemented method comprising:
generating a plurality of ingestion objects based on data captured by one or more sensors;
generating, based on the plurality of ingestion objects, a plurality of transformed objects and a plurality of manifests each respectively including a history of each transformed object and a data integrity value representing the transformed object; and offloading one or more copies of at least one of the plurality of manifests or the plurality of transformed objects to one or more remote computing systems.

2. The computer-implemented method of claim 1, further comprising:

offloading, from an autonomous vehicle (AV) to one or more data center computing systems, a first copy of a manifest associated with at least one new transformed object; and offloading, from the AV to one or more AV servicing station computing systems, a second copy of the manifest and the at least one new transformed object.

3. The computer-implemented method of claim 2, further comprising:

determining the first copy and the second copy do not correspond;

determining a Service Level Agreements (SLA) corresponding to the at least one new transformed object is violated; and docking the AV at an AV servicing station for diagnosis based on the SLA.

4. The computer-implemented method of claim 2, further comprising:

determining that no SLA is applicable to the at least one new transformed object;

annotating error information corresponding to offloading or uploading the at least one new transformed object; and discarding the at least one new transformed object.

5. The computer-implemented method of claim 2, further comprising:

determining a period of time between receiving the first copy and the second copy violates an SLA; and docking the AV at an AV servicing station for diagnosis based on the SLA.

6. The computer-implemented method of claim 2, wherein the SLA specifies at least one of a criticality of the at least one new transformed object or a maximum number of offload or upload errors.

7. The computer-implemented method of claim 1, wherein offloading the one or more copies to the one or more remote computing systems comprises:

offloading copies of the plurality of manifests from an AV to one or more data center computing systems.

8. The computer-implemented method of claim 1, wherein offloading the one or more copies to the one or more remote computing systems comprises:

offloading copies of the plurality of manifests and the plurality of transformed objects from an AV to one or more AV servicing station computing systems.

9. The computer-implemented method of claim 1, further comprising:

offloading, from an AV to one or more data center computing systems, a first copy of a manifest associated with at least one new transformed object;

determining an SLA is violated based on the first copy; and docking the AV at an AV servicing station for diagnosis based on the SLA.

10. The computer-implemented method of claim 1, further comprising:

determining, by one or more AV servicing station computing systems, an integrity value for at least one transformed object of the plurality of transformed objects that has completed offloading from an AV;

reconciling the at least one transformed object based on a comparison between the integrity value and a second copy of a manifest corresponding to the at least one transformed object; and notifying the AV can erase a first copy of a manifest corresponding to the at least one transformed object and the at least one transformed object from a local storage of the AV.

11. A system comprising:

one or more processors; and memory including instructions that, when executed by the one or more processors, cause the system to:

generate a plurality of ingestion objects based on data captured by one or more sensors;

generate, based on the plurality of ingestion objects, a plurality of transformed objects and a plurality of manifests each respectively including a history of each transformed object and a data integrity value representing the transformed object; and offload one or more copies of at least one of the plurality of manifests or the plurality of transformed objects to one or more remote computing systems.

12. The system of claim 11, wherein the memory includes instructions that, when executed by the one or more processors, cause the system to:

offload, from an autonomous vehicle (AV) associated with the system to one or more data center computing systems, a first copy of a manifest associated with at least one new transformed object; and offload, from the AV to one or more AV servicing station computing systems, a second copy of the manifest and the at least one new transformed object.

13. The system of claim 12, wherein the memory includes instructions that, when executed by the one or more processors, cause the system to:

determine the first copy and the second copy do not correspond;

determine a Service Level Agreements (SLA) corresponding to the at least one new transformed object is violated; and dock the AV at an AV servicing station for diagnosis based on the SLA.

14. The system of claim 12, wherein the memory includes instructions that, when executed by the one or more processors, cause:

determine that no SLA is applicable to the at least one new transformed object;

annotate error information corresponding to offloading or uploading the at least one new transformed object; and discard the at least one new transformed object.

15. The system of claim 12, wherein the memory includes instructions that, when executed by the one or more processors, cause:

determine a period of time between receiving the first copy and the second copy violates an SLA; and dock the AV at an AV servicing station for diagnosis based on the SLA.

16. The system of claim 12, wherein the SLA specifies at least one of a criticality of the at least one new transformed object or a maximum number of offload or upload errors.

17. The system of claim 11, wherein offloading the one or more copies to the one or more remote computing systems comprises:

offloading copies of the plurality of manifests from an AV to one or more data center computing systems.

18. The system of claim 11, wherein the memory includes instructions that, when executed by the one or more processors, cause the system to:
- determine at least one first copy of a manifest of the plurality of manifests and a corresponding second copy of the manifest match; and
- schedule uploading of a transformed object corresponding to the manifest between one or more AV servicing station computing systems and one or more data center computing systems at a time after an AV has completed offloading the transformed object to the one or more AV servicing station computing systems.

19. A non-transitory computer-readable storage medium including instructions that, when executed by one or more processors of a computing system, cause the computing system to:
- generate a plurality of ingestion objects based on data captured by one or more sensors;
- generate, based on the plurality of ingestion objects, a plurality of transformed objects and a plurality of manifests each respectively including a history of each transformed object and a data integrity value representing the transformed object; and
- offload one or more copies of at least one of the plurality of manifests or the plurality of transformed objects to one or more remote computing systems.

20. The non-transitory computer-readable storage medium of claim 19, wherein first copies of the plurality of manifests are offloaded over a first communication channel and second copies of the plurality of manifests and the plurality of transformed objects are offloaded over a second communication channel.

* * * * *